United States Patent
Ning et al.

(10) Patent No.: US 10,199,175 B2
(45) Date of Patent: Feb. 5, 2019

(54) METHOD OF PRODUCING SOLID ELECTROLYTIC CAPACITOR AND CAPACITOR MADE THEREBY

(71) Applicant: KEMET Electronics Corporation, Simpsonville, SC (US)

(72) Inventors: Liancai Ning, Jiangsu (CN); Qingping Chen, Simpsonville, SC (US); Philip M. Lessner, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 27 days.

(21) Appl. No.: 15/090,692

(22) Filed: Apr. 5, 2016

(65) Prior Publication Data

US 2016/0300665 A1    Oct. 13, 2016

Related U.S. Application Data

(60) Provisional application No. 62/144,400, filed on Apr. 8, 2015.

(51) Int. Cl.
| | |
|---|---|
| *H01G 9/028* | (2006.01) |
| *H01G 9/00* | (2006.01) |
| *H01G 9/15* | (2006.01) |
| *H01G 9/042* | (2006.01) |
| *H01G 9/045* | (2006.01) |
| *H01G 9/052* | (2006.01) |
| *H01G 9/07* | (2006.01) |

(52) U.S. Cl.
CPC ........... *H01G 9/028* (2013.01); *H01G 9/0032* (2013.01); *H01G 9/045* (2013.01); *H01G 9/0425* (2013.01); *H01G 9/0525* (2013.01); *H01G 9/07* (2013.01); *H01G 9/15* (2013.01)

(58) Field of Classification Search
CPC ........ H01G 9/028; H01G 9/042; H01G 9/045; H01G 9/15; H01G 9/145; H01G 9/02; H01G 9/04; H01G 9/048
See application file for complete search history.

(56) References Cited

U.S. PATENT DOCUMENTS

| | | | | |
|---|---|---|---|---|
| 2,936,514 | A | | 5/1960 | Millard |
| 4,781,802 | A | * | 11/1988 | Fresia .................. H01G 9/0032 205/171 |
| 6,136,176 | A | | 10/2000 | Wheeler et al. |
| 6,519,137 | B1 | * | 2/2003 | Nitta ..................... H01G 9/025 29/25.03 |
| 7,563,290 | B2 | | 7/2009 | Qiu et al. |
| 2003/0055152 | A1 | * | 3/2003 | Ottenheijm ............ C08L 67/02 524/494 |
| 2008/0297984 | A1 | * | 12/2008 | Ogiwara ................ H01G 9/048 361/532 |
| 2011/0281154 | A1 | * | 11/2011 | Vissers ................ H01G 9/0003 429/163 |

(Continued)

*Primary Examiner* — Nguyen T Ha
(74) *Attorney, Agent, or Firm* — Joseph T. Guy; Patent Filing Specialist, Inc.

(57) ABSTRACT

A method for manufacturing a solid electrolytic capacitor and an improved capacitor formed thereby is described. The method includes forming a dielectric on an anode at a formation voltage; forming a conductive polymer layer on the dielectric; and reforming the dielectric in a reformation electrolyte at a reformation voltage wherein the reformation electrolyte comprises a thermal degradation inhibitor.

15 Claims, 2 Drawing Sheets

(56) References Cited

U.S. PATENT DOCUMENTS

Figure 1:
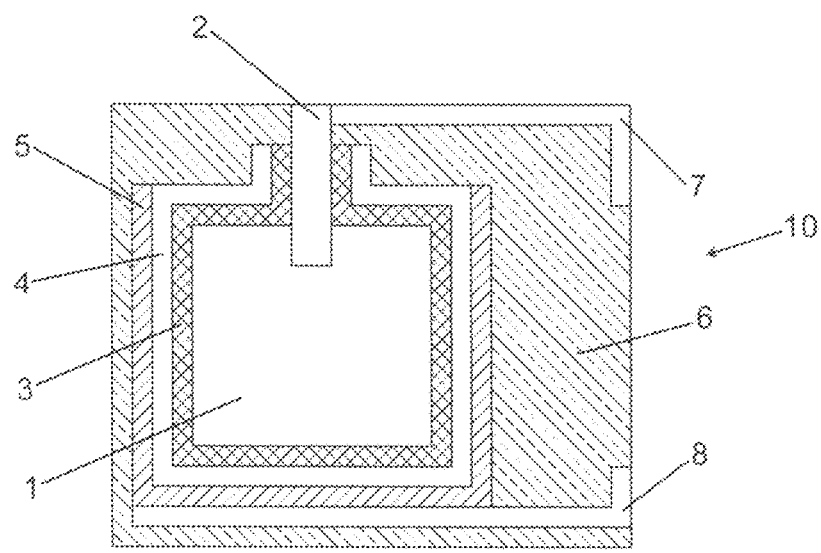

| | | | |
|---|---|---|---|
| 2012/0206859 A1* | 8/2012 | Chacko | H01G 9/0036 361/529 |
| 2013/0027847 A1* | 1/2013 | Aoyama | H01G 9/02 361/530 |
| 2013/0157129 A1* | 6/2013 | Uemura | C09D 5/24 429/211 |
| 2013/0337249 A1* | 12/2013 | Fenyvesi | H01B 3/50 428/219 |

* cited by examiner

METHOD OF PRODUCING SOLID ELECTROLYTIC CAPACITOR AND CAPACITOR MADE THEREBY

CROSS-REFERENCE TO RELATED APPLICATIONS

The present invention claims priority to U.S. Provisional Patent Appl. No. 62/144,400 filed Apr. 8, 2015, which is incorporated herein by reference.

BACKGROUND

The present invention is related to an improved method of forming a solid electrolytic capacitor and a capacitor formed thereby. More specifically, the present invention is related to a capacitor with improved reliability due to minimization of the degradation that typically occurs in the cathode during reformation of the dielectric.

The process of forming a solid electrolytic capacitor is well documented. In general, the process includes the formation of a dielectric on an anode followed by the formation of a solid conductive material on the dielectric. Though manganese dioxide is a well known solid conductive material, the instant invention is specific to electrically conductive polymeric cathodes such as polyaniline, polypyrrole, polythiophene and their derivatives. Electrically conductive polymeric cathodes have proven to be very effective due to their low equivalent series resistance and non-burning, non-ignition, failure mode. The electrically conductive polymeric cathodes are not without limitations and mitigation of one limitation is provided herein.

Electrically conductive polymeric cathodes are formed by either an in-situ process, including chemical or electrochemical polymerization of monomers, or by coating with a pre-formed conductive polymer dispersion. In-situ polymerization is particularly preferred for the initial polymer layers due to the increased penetration of conductive polymer into the interstitial regions of the porous pellet. Unfortunately, the in-situ polymerization degrades the dielectric. While not limited to any theory, it is hypothesized that the dielectric is degraded during in-situ polymerization of conductive polymer due to the interaction between high-energy radicals, from the polymerization process, and the dielectric surface. U.S. Pat. No. 7,563,290 describes some consequences of dielectric degradation by in-situ polymerization of conductive polymer, including reduced voltage withstanding capability, as indicated by a decrease in breakdown voltage.

Due to the aforementioned dielectric degradation it has become common in the art to subject the dielectric to a reformation step after polymer layer formation wherein the capacitor is immersed in an electrolyte solution with application of a DC voltage below that used in dielectric formation. This has long been the standard procedure for manganese dioxide based capacitors, as described in U.S. Pat. No. 2,936,514, and has been adapted for use in conductive polymer based capacitors. In dielectric reformation a diluted aqueous acidic solution; such as phosphoric acid, sulfuric acid or nitric acid; can be used for dielectric reformation with an applied DC voltage that is 60-85% of the dielectric formation voltage as described, for example, in U.S. Pat. No. 6,136,176. The acids are preferably the organic acids whose anions are used as dopants in the conductive polymer, such as toluenesulfonic acid, dodecylbenzensulfonic acid, and camphorsulfonic acid.

Unfortunately, the dielectric reformation process, done to counteract the dielectric degradation resulting from the cathode formation, degrades the polymeric cathode thereby creating localized non-conductive regions in the conductive polymer layer which reduces the current capacity of the conductive polymer layer. While not limited to theory, it is hypothesized that during the dielectric reformation process oxidation of conductive polymer occurs and the heat generated by the oxidation further degrades additional polymer leading to, under some conditions, catastrophic breakdown or localized damage to the dielectric. The skilled artisan was therefore bound by, on one extreme, inferior dielectric resulting from the formation of the conductive polymer, and on the other extreme, by poor performance due to polymer oxidation resulting from the reformation of the dielectric. The instant invention provides a solid electrolytic capacitor with improved reliability by locally controlling the electric current and heat generation during reformation thereby allowing for further dielectric reformation without degradation of the conductive polymer.

SUMMARY OF THE INVENTION

It is an object of the invention to provide an improved solid electrolytic capacitor.

It is another object of the invention to provide an improved method of preparing an improved solid electrolytic capacitor by reforming dielectric in the presence of a reforming electrolyte which provides for locally controlled current flow and minimization of the impact of conductive polymer heating.

A specific feature of the invention is the use of a reforming electrolyte formulation comprising thermal degradation inhibitors selected from flame retardants, silica, silica precursors, and substances whose solubility decreases with increased temperature.

These and other advantages, as will be realized, are provided in a method of manufacturing a solid electrolytic capacitor. The method includes forming a dielectric on an anode at a formation voltage; forming a conductive polymer layer on the dielectric; and reforming the dielectric in a reformation electrolyte at a reformation voltage wherein the reformation electrolyte comprises a thermal degradation inhibitor.

Yet another embodiment is provided in a solid electrolytic capacitor comprising an anode; a dielectric on the anode wherein the dielectric comprises a thermal degradation inhibitor; and a conductive polymeric cathode on the dielectric.

FIGURES

FIG. 1 schematically illustrates in cross-sectional view a capacitor.

Figure 2:
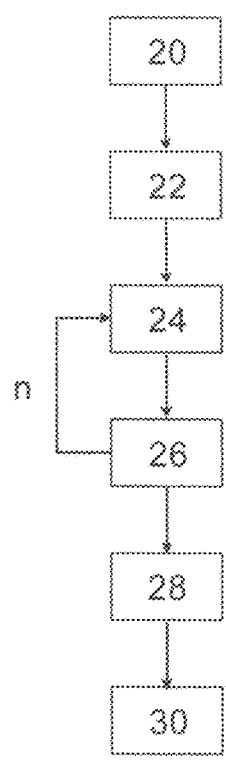

FIG. 2 is a flow chart representation of an embodiment of the invention.

Figure 3:
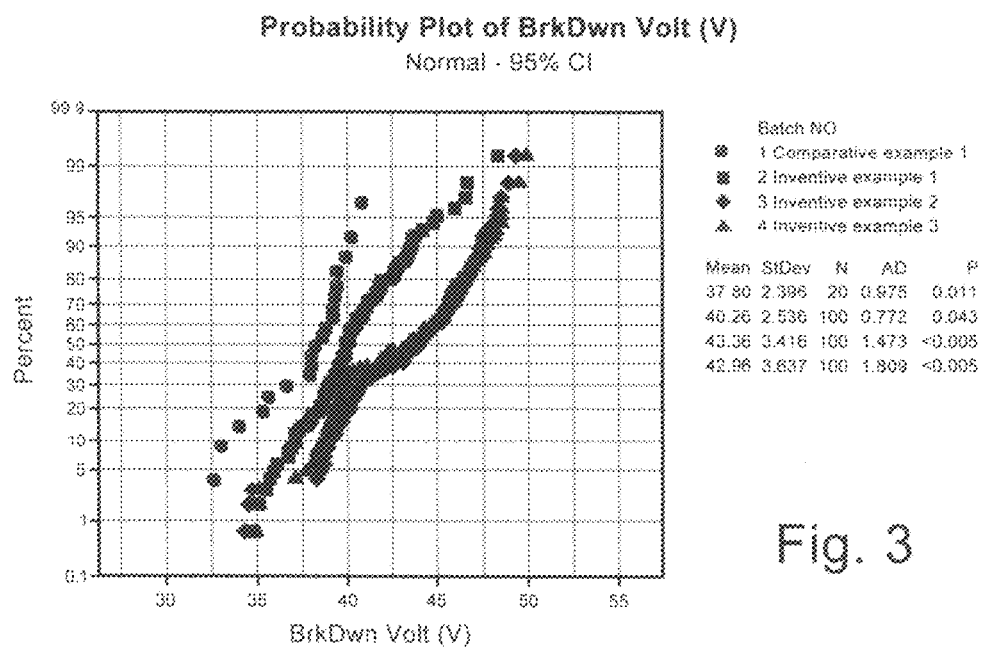

FIG. 3 graphically illustrates a breakdown voltage comparison between the inventive embodiment and a comparative embodiment in breakdown voltage test.

DESCRIPTION

The present invention is related to an improved solid electrolytic capacitor and a method of making a solid electrolytic capacitor. More specifically, the present invention is related to a solid electrolytic capacitor with a dielectric which is reformed, after conductive polymer formation, in a reforming electrolyte comprising thermal degradation inhibitors.

The invention will be described with reference to the various figures forming an integral, non-limiting, component of the disclosure. Throughout the disclosure similar elements will be numbered accordingly.

An embodiment of the invention will be described with reference to FIG. 1 wherein a solid electrolytic capacitor is illustrated schematically in cross-sectional view. In FIG. 1, a capacitor, generally represented at 10, comprises an anode, 1, typically in the form of a pressed pellet as described elsewhere herein. An anode wire, 2, extends from the anode. A dielectric layer, 3, encases at least a portion of the anode and preferably a portion of the anode wire. The dielectric layer is preferably formed as an oxide of the anode and is reformed in a reformation electrolyte as described herein therefore the dielectric will have some residual thermal degradation inhibitor, or the reaction product thereof, incorporated therein. A conductive polymer layer, 4, functions as the cathode and encases up to the entire dielectric with the understanding that the cathode and anode are not in direct electrical contact. It is known in the art that adhesion of a lead frame to a conductive polymer layer is difficult. This has lead to the common use of a transition, or adhesion, layers intended to increase adhesion. The adhesion layers, 5, encase at least a portion of the conductive polymer layer and preferably comprise multiple sub-layers including at least one conductive carbon containing layer, which adheres to the conductive polymer, and at least one conductive metal layer, which adheres to the conductive carbon layer. A cathode lead, 8, is electrically attached to the conductive metal layer such as by a conductive adhesive or by welding. The anode wire, 2, is electrically attached, such as by welding, to an anode termination, 7. The entire capacitor, except for a portion of the anode lead and cathode lead, is preferably encased in a non-conductive resin, 8.

The inventive process for forming a capacitor will be described with reference to FIG. 2 wherein the process is illustrated in flow chart representation. In FIG. 2, an anode is formed at 20, for example, by pressing and sintering a powder to form a porous body. The pellet may be made from any suitable conductive material and preferably a valve metal such as tantalum, aluminum, niobium, titanium, zirconium, hafnium, alloys of these elements, or a conductive oxide thereof such as NbO. Tantalum is a preferred anode material. An anode wire is attached to the anode by inserting an anode wire into the powder prior to pressing or by welding the anode wire to the surface of the pressed pellet. Inserting the wire into the powder is preferred.

An oxide film is formed on the sintered pellet at 22 as the dielectric. The dielectric may be formed using any suitable electrolyte solution, referred to as a forming electrolyte, such as a phosphoric acid or a phosphate-containing solution. A formation voltage of from about 9 V to about 250 V is commonly applied. The formation voltage typically ranges from 2.0 to 3.5 times the rated voltage of the capacitor. The reformation electrolyte as defined herein can be utilized for initial dielectric formation.

A conductive polymeric layer is formed on the dielectric at 24 preferably by immersing the pellet in a series of impregnating solutions, preferably sequentially, until the desired thickness is achieved. The impregnating solutions preferably contain monomer, oxidizing agent, dopant and other adjuvants as known to those of skill in the art. The selection of a suitable solvent for the solution is well within the level of skill in the art. Examples of suitable solvents include ketones and alcohols such as acetone, pyridine, tetrahydrofuran, methanol, ethanol, 2-propanol, and 1-butanol. The monomer concentration may be from about 1.5 wt. % to about 20 wt. %, more preferably from about 5 wt. % to about 15 wt. % for demonstration of the invention. Suitable monomers for preparing conductive polymers include but are not limited to aniline, pyrrole, thiophene, and derivatives thereof. A preferred monomer is 3,4-ethylenedioxythiophene. The oxidizing agent concentration may be from about 6 wt. % to about 45 wt. % and more preferably from about 16 wt. % to about 42 wt. % for demonstration of the invention. Oxidizing agents for preparing conductive polymers include Fe(III) salts of organic and inorganic acids, alkali metal persulfates, ammonium persulfate, and others. A preferred oxidant for demonstration of the invention is Fe(III) tosylate. The dopant concentration may be from about 5 wt. % to about 30 wt. % and more preferably from about 12 wt. % to about 25 wt. %. Any suitable dopant may be used, such as dodecyl benzenesulfonate, p-tosylate, or chloride. The preferred dopant is p-tosylate. The pellets are cured at a temperature of from 65° C. to about 160° C. and more preferably from about 80° C. to about 120° C. thereby allowing the monomer to polymerize. After curing, the polymer layer is preferably washed in deionized water or another solvent.

After the washing cycle the dielectric is reformed in a reformation electrolyte at 26 wherein the reformation electrolyte is described further herein. The applied reformation voltage is preferably 30-120% of the formation voltage used to form the dielectric prior to initial conductive polymer deposition. More preferably, the reformation voltage is 50-90% of the formation voltage. After dielectric reformation it is preferable to wash in deionized water or another solvent.

The cycle of dipping-curing-washing-reforming-washing is repeated "n" times to build up the desired thickness of conductive polymer. The number of cycles is preferably 1-15. In some embodiments the initial polymer layer may be formed by repeated in-situ polymerization to achieve an initial thickness followed by deposition of a conductive polymer from a slurry, preferably by dipping, to reach the desired thickness.

A transition, or adhesion, layer is formed on the conductive polymer layer at 28 wherein the transition layer preferably comprises a carbon containing layer and a metal containing layer. The carbon containing layer preferably comprises conductive carbon in a matrix and is preferably formed by dipping into a solution or slurry comprising carbon, a suitable matrix material and an optional solvent. The metal containing layer comprise metal in a matrix or a solid metal layer formed by electro-deposition, preferably by reverse bias, vapor deposition or the like.

The capacitor is finished at 30 by electrically connecting an anode lead to the anode wire and a cathode lead to the cathode, preferably at the metal containing layer, such as by a conductive adhesive or by welding. The capacitor can be encased in a non-conducting resin if desired and is preferably tested for compliance with standard performance criteria.

The reforming electrolyte comprises a solvent, an acid and a thermal degradation inhibitor selected from a flame retardant, a silica or silica precursor and a substance whose solubility decreases with increasing temperature.

The solvent for the reformation electrolyte is selected from water, alkanol amines and polyols. Water is a particularly preferred solvent. Particularly suitable alkanol amines include monoethanol amine, diethanol amine, triethanol amine, ethyl diethanolamine, diethyl ethanolamine, dimethyl ethanolamine and dimethyl ethoxy ethanolamine (dimethyl amino ethoxy ethanol). Particularly preferred polyols include ethylene glycol, propylene glycol, butylene glycol, pentylene glycol, glycerin, polyethylene glycol and polyglycerin.

Particularly preferred acids for the reformation electrolyte include phosphoric acid, sulfuric acid, nitric acid, boric acid, citric acid, adipic acid, acetic acid, phytic acid, oxalic acid and silic acid. A preferred acid for demonstration of the invention is phosphoric acid. The acid concentration may be from about 0.1 wt. % to about 10 wt. % and more preferably from about 0.5 wt. % to about 5 wt. %. Particularly preferred flame retardants comprise minerals, such as aluminum hydroxide, magnesium hydroxide, huntite, and hydromagnesite; various hydrates including magnesium sulfonate hydrate, magnesium carbonate hydrate, cobalt carbonate hydrate and cobaltous nitrate hydrate; borates; and organohalogen compounds, such as organochlorines, organobromines and polymeric brominated compounds. The organochlorines include chlorendic acid derivatives and chlorinated paraffins; the organobromines include decabromodiphenyl ether and decabromodiphenyl ethane; the polymeric brominated compounds include brominated polystyrenes, brominated carbonate oligomers, brominated epoxy oligomers, tetrabromophthalic anhydride, tetrabromobisphenol A, and hexabromocyclododecane; organophosphates include triphenyl phosphate, resorcinol bis(diphenylphosphate), bisphenol A diphenyl phosphate, and tricresyl phosphate; and antimony trioxide.

Particularly preferred silica precursors include: silicon oil, siloxane and silane, organo silicon compounds, and Si containing sol-gel; Si containing sol-gel include silica sol, silicate sol and water glass. The silica can be produced from the precursors at high current sites by excessive heat generated during reforming. The silica could isolate the defective dielectric sites from conductive polymer, either by addition or produced from the precursor, therefore preventing the heat from causing significant damage.

Substances whose solubility decrease with increasing temperature include materials which comprise hydrated calcium hydroxide, hydrated calcium acetate, cellulose and cellulose derivatives. When the high electric current of reformation generates heat to increase the temperature this type of substance would precipitate from reforming electrolyte solution due to its reduced solubility. The precipitation of this type of substance could block the defective dielectric sites from conductive polymer. The electric current would be reduced and the overoxidation of conductive polymer and the dielectric damage caused by the high current realized during reformation can be avoided. The precipitation and re-dissolution of this type of substance can be reversible with the change of temperature. This is particularly beneficial for maintaining a continuous reformation process to produce high quality capacitors.

The conductive carbon layer of the transition, or adhesion, layer can be formed on the conductive polymer layer, preferably, by application of a carbon paste layer comprising conductive carbon, such as carbon black or graphite, in a binder. The binder can include, for example, polyacrylic acid-based polymer, polyvinyl alcohol, cellulose ester, polyacrylamide, methyl cellulose, or the like, with polyacrylic acid-based polymer being a preferred binder.

The metal containing layer of the transition, or adhesion layer, can include a metal paste layer containing metal particles and a binder resin. Silver and nickel are preferred metals. The binder resin is not particular limited, but can be implemented by, for example, an ester-based polymer, an imide-based polymer, an epoxy-based polymer or the like. The ester-based polymer is preferred. The metal layer may also be an electroplated metal layer preferably formed by reverse bias. The electroplated metal is preferably nickel or silver with nickel being a preferred plated metal.

EXAMPLES

Inventive Example 1

Tantalum powder with a charge of 40,000 CV/g was pressed and sintered to form a porous anode with a dimension of 0.84 mm thick, 3.25 mm wide and 4.69 mm long. The anode was anodized in a phosphoric acid electrolyte to 60 V.

An impregnation solution containing 12 wt. % 3,4-ethylenedioxythiophene monomer, 28 wt. % Fe(III) p-tosylate oxidizer, 16 wt. % butanol with the balance being 2-propanol was prepared. A group of anodes were repetitively dipped in the impregnation solution and cured at 85° C. for 60 minutes. The anodes were washed in deionized water at room temperature and dried after each cure cycle. A reformation electrolyte was prepared containing 1.3 wt % aluminum hydroxide sol as a thermal degradation inhibitor, 1 wt % phosphoric acid and 97.7 wt % deionized water. The aluminum hydroxide sol was obtained from Nanjing Fuhao. The anodes were reformed to 45V in the reformation electrolyte at room temperature after each wash cycle. The anodes were processed through a series of 7 such steps.

Carbon paint and silver paint were coated on the exterior of the anodes. The tantalum wire was welding to a positive termination. A negative termination was connected to the silver paint layer by a conductive adhesive. The assembled body was encapsulated in an epoxy resin to form a finished capacitor. The 47 μF, 20V rated capacitors were tested by break down (BrkDwn) voltage test. The result is shown in FIG. 3.

Inventive Example 2

Capacitors were prepared from the same anode lot as Inventive Example 1 except silica sol, obtained from Gelest, was added into reformation electrolyte as the thermal degradation inhibitor instead of the aluminum hydroxide. The capacitors were tested by break down voltage test. The result is shown in FIG. 3.

Inventive Example 3

Capacitors were prepared from the same anode lot as Inventive Example 1 except cellulose, obtained from Hercules, was added to the reformation electrolyte as the thermal degradation inhibitor instead of the aluminum hydroxide. The capacitors were tested by break down voltage test. The result is shown in FIG. 3.

Comparative Example 1

Capacitors were prepared from the same anode lot as Inventive Example 1 except no thermal degradation inhibitor was added to the reformation electrolyte. The capacitors were tested by break down voltage test. The result is shown in FIG. 3.

The invention has been described with reference to the preferred embodiments without limit thereto. One of skill in the art would appreciate and realize additional embodiments which are not specifically stated herein but which are within the metes and bounds of the invention as more specifically set forth in the claims appended hereto.

The invention claimed is:

1. A solid electrolytic capacitor comprising:
an anode;
a solid dielectric oxide on said anode wherein said dielectric comprises a thermal degradation inhibitor;
a conductive polymeric cathode on said dielectric; and
wherein said thermal degradation inhibitor comprises a material selected from the group consisting of: a flame retardant; a silica; a silica precursor and a substance whose solubility decreases with increasing temperature.

2. The solid electrolytic capacitor of claim 1 wherein said flame retardant comprises a mineral.

3. The solid electrolytic capacitor of claim 1 wherein said mineral is selected from the group consisting of aluminum hydroxide, magnesium hydroxide, huntite and hydromagnesite.

4. The solid electrolytic capacitor of claim 1 wherein said flame retardant comprises an organohalogen compound.

5. The solid electrolytic capacitor of claim 4 wherein said organohalogen compound is selected from the group consisting of organochlorines, organobromines and polymeric brominated compounds.

6. The solid electrolytic capacitor of claim 1 wherein said silica precursor is selected from the group consisting of silicon oil, siloxane and silane, organo silicon compounds, and Si containing sol-gel.

7. The solid electrolytic capacitor of claim 1 wherein said substance whose solubility decreases with increasing temperature is selected from the group consisting of hydrated calcium hydroxide, hydrated calcium acetate, cellulose and cellulose derivatives.

8. The solid electrolytic capacitor of claim 1 wherein said thermal degradation inhibitor is antimony trioxide.

9. The solid electrolytic capacitor of claim 1 wherein said conductive polymeric cathode comprises a polymerized monomer selected from the group consisting of aniline, pyrrole, thiophene and derivatives thereof.

10. The solid electrolytic capacitor of claim 9 wherein said monomer is 3,4-ethylenedioxythlophene.

11. The solid electrolytic capacitor of claim 1 further comprising an anode lead in electrical connection with an anode wire wherein said anode wire extends from said anode.

12. The solid electrolytic capacitor of claim 1 further comprising at least one of a carbon containing layer and a metal containing layer.

13. The solid electrolytic capacitor of claim 12 further comprising a cathode lead electrically connected to said metal containing layer.

14. The solid electrolytic capacitor of claim 1 wherein said anode comprises a valve metal.

15. The solid electrolytic capacitor of claim 14 wherein said valve metal is selected from the group consisting of tantalum, aluminum, niobium, titanium, zirconium, hafnium, alloys of these elements and a conductive oxide thereof.

* * * * *